United States Patent Office 3,388,916
Patented June 18, 1968

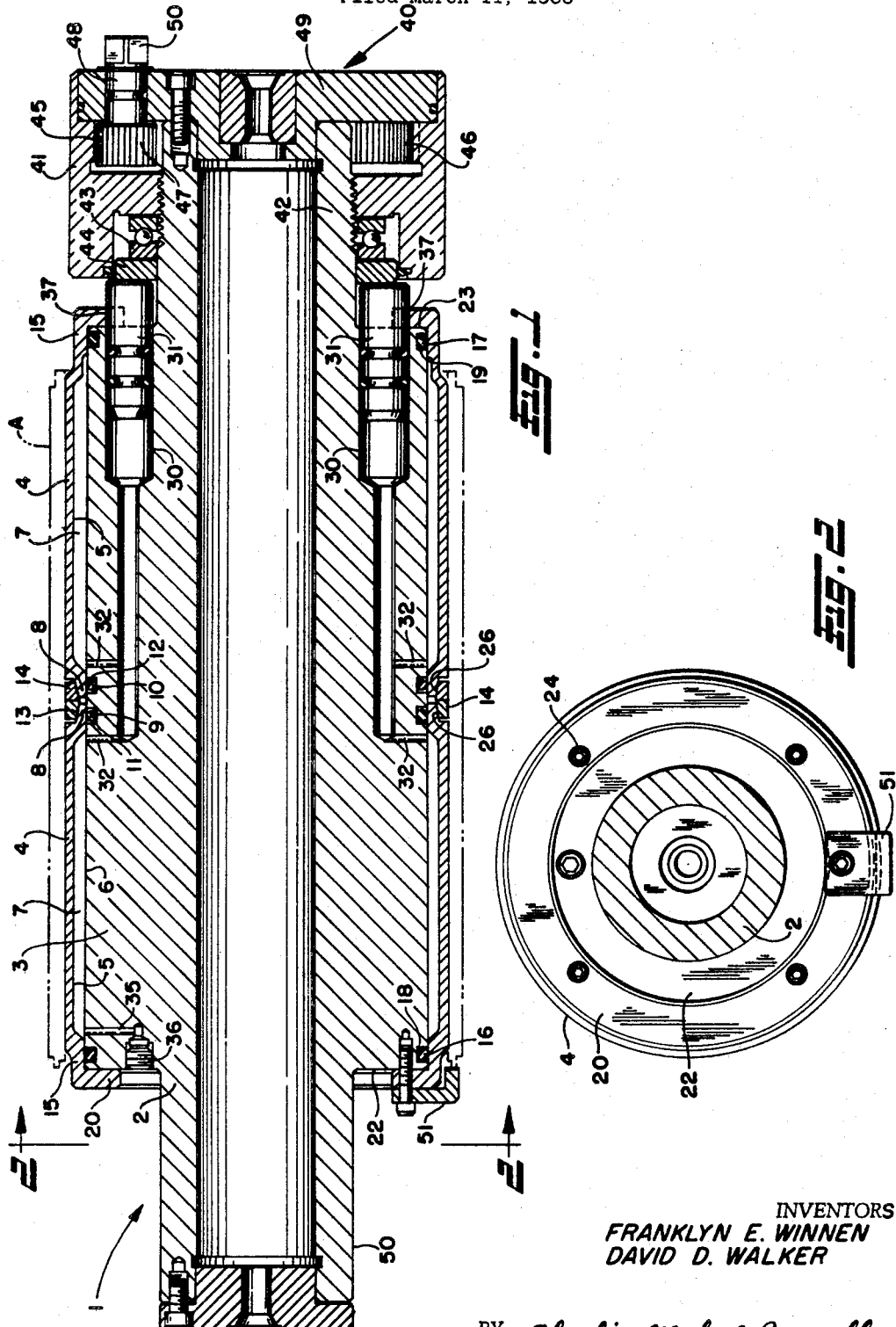

3,388,916
HYDRAULIC ARBOR
Franklyn E. Winnen, Cleveland, and David D. Walker, Chagrin Falls, Ohio, assignors to Erickson Tool Company, Solon, Ohio, a corporation of Ohio
Filed Mar. 11, 1966, Ser. No. 533,624
9 Claims. (Cl. 279—2)

The present invention relates generally, as indicated, to a hydraulic arbor of the type including one or more thin metal sleeves which are adapted to be expanded by hydraulic pressure within their elastic limit into tight gripping engagement with a workpiece or tool disposed therearound for holding the workpiece during machining or inspection.

Heretofore, it has been the usual practice either to press fit the deformable sleeve of a hydraulic arbor on the body of the device with a seal disposed adjacent the ends of the sleeve or weld such sleeve ends to the body to preclude leakage of hydraulic fluid between the body-sleeve joints during expansion of the sleeve. However, close tolerances of the sleeve and body must be maintained to achieve the necessary press fit for preventing fluid leakage and, in addition, special tools are required to assemble and disassemble the sleeve and body. Welding the joints also requires special tools and does not permit easy assembly or disassembly. Moreover, the welding operation generally causes deformation of the various parts of the device with consequent strains therein.

It is accordingly a primary object of this invention to provide a hydrostatic arbor of the type indicated with novel means for permitting quick assembly and disassembly of the deformable sleeve on the body of the device, and when assembled, provides a fluid-tight seal between the body-sleeve joints even when the sleeve is radially expanded by the application of high fluid pressure.

Another object is to provide such a hydraulic arbor with a tapered wedge ring for tightly clamping the deformable sleeve to the body.

Still another object is to provide such a hydraulic arbor with novel means for creating the hydraulic pressure necessary to expand the deformable sleeve into tight gripping engagement with a workpiece.

Other objects and advantages of the present invention will become apparent as the following description proceeds.

To the accomplishment of the foregoing and related ends, the invention, then, comprises the features hereinafter fully described and particularly pointed out in the claims the following description and the annexed drawing setting forth in detail a certain illustrative embodiment of the invention, this being indicative, however, of but one of the various ways in which the principles of the invention may be employed.

In such annexed drawing:

FIG. 1 is a longitudinal cross-section of a preferred form of hydraulic arbor constructed in accordance with the present invention; and FIG. 2 is a partial vertical section of the hydraulic arbor of FIG. 1 taken on the plane of the line 2—2 thereof.

Referring now to the details of the drawing, the preferred embodiment of hydraulic arbor 1 shown consists of a body 2 having an enlarged cylindrical portion 3 between the ends thereof around which there is disposed a pair of axially adjacent thin metal sleeves 4 having internal grooves 5 to define with the outer cylindrical surface 6 of the body 2 a pair of axially spaced annular fluid chambers 7. The adjacent inner ends 8 of the sleeves 4 are slightly spaced from each other in close sliding contact with the cylindrical portion 3 to overlie a pair of O-rings 9 and 10 or like packing rings of rubber-like material received in annular grooves 11 and 12 in such cylindrical portion. Moreover, the outer surfaces of such inner ends 8 are preferably stepped as shown in FIG. 1 with the axially extending portions 13 being tapered for engagement by similarly tapered wedge rings 14 which hold the sleeve in tight engagement with the cylindrical portion 3, as will be more fully explained in the discussion to follow.

The radially thickened outer ends 15 of the sleeves 4 likewise are in close sliding contact with the outer surface 6 of the cylindrical portion 3 adjacent O-rings 16 and 17 disposed in annular grooves 18 and 19 in such cylindrical portion and, in addition, are provided with inturned lip portions 20 for attaching the sleeves to the shoulders 22 and 23 on the body 2 as by means of a plurality of cap screws 24 (see FIG. 2).

Due to the wedging of the inner sleeve ends 8 by the wedge rings 14 into tight engagement with the cylindrical portion 3 and the bolting of the outer radially thickened sleeve ends 15 to the body 2, when the sleeves 4 are expanded by supplying a hydraulic fluid such as oil or grease to the annular chambers 7 under substantial pressure, there is no deformation of the sleeves 4 adjacent the O-rings 9, 10, 16, and 17 and thus no leakage of the hydraulic fluid can occur between the body 2 and sleeve 4 joints, even without an article A telescoped over the sleeves 4.

It can now be seen that the sleeves 4 may be quickly assembled on the body 2 without the use of special tools to provide the desired fluid tight seals between the sleeve-body joints simply by positioning the wedge rings 14 around the cylindrical portion 3 adjacent the axial center thereof, telescopically sliding the sleeves 4 onto the cylindrical portion 3 from opposite ends thereof until their inner ends 8 are received in the tapered openings 26 of the wedge rings 14 and then tightening the cap screws 24 to secure the inturned lip portions 20 to the shoulders 22 and 23, during which the inner sleeve ends 8 are firmly wedged into tight engagement with the outer cylindrical surface 6 by the wedge rings 14.

To disassemble the sleeves 4 from the body 2, it is only necessary to loosen the cap screws 24 to free the inturned lip portions 20 and slide the sleeves 4 off of the cylindrical portion 3 in opposite directions.

For supplying hydraulic fluid to the fluid chambers 7, there is a pair of axial passages 30 in the body 2 with plungers 31 axially slidable therein, and additional passages 32 communicating each passage 30 with both fluid chambers 7. An opening 35 in the body 2 communicates with one of the fluid chambers 7 through which the chambers 7 and passages 30, 32 are adapted to be filled with hydraulic fluid, such opening 35 being adapted to be closed by a plug 36 subsequent to filling.

The plungers 31 are shown extending axially beyond the cylindrical portion 3 through slots 37 in the lip portion 20 of the adjacent sleeve 4 for actuation by a plunger actuating mechanism 40 including a nut 41 threadably engaging one end 42 of the body 2 which, when tightened, will apply an axial inward force against the outer ends of the plungers 31 through a ball thrust bearing 43 and thrust washer 44 disposed in a counterbore in such nut 41. As evident, when the plungers 31 are moved axially inwardly in the passages 30, they will apply a compressive force on the hydraulic fluid in such passages to effect the desired expansion of the sleeves 4 within their elastic limits.

Any suitable means such as a wrench may be used to tighten the nut 41 to achieve the desired axial advance of the plungers 31. However, in the preferred form shown, the nut 41 has an annular groove 45 with internal gear teeth 46 which are engaged by a pinion 47 supported by a shaft 48 extending through an end plate 49 attached to the body 2, whereby rotation of the pinion 47 by a crank handle (not shown) on the squared end 50 of the shaft 48 will provide a substantial mechanical advantage for tightening the nut 41.

In use, the pilot end 50 of the arbor body 2 may be secured to the spindle of a metal-working machine or machine tool, not shown, and a workpiece, tool holder, or other article A telescoped over the nut 41 onto the sleeve 4 until it engages a stop 51 which may be bolted or otherwise secured to the shoulder 22 of the arbor body. The article A, although it need not be perfectly round, should have a close sliding fit on the sleeves 4. Now a crank handle may be inserted on the end of the shaft 48 and rotated to cause axial inward movement of the nut 41 and plunger 31, whereupon pressure is applied to the hydraulic fluid to cause expanding of the sleeves 4 into firm and accurate gripping engagement along a substantial and major portion of the length of the article A. The sleeves 4 when expanded as aforesaid compensate for any out-of-roundness of the workpiece, and create an extremely rigid and accurate centering fit therebetween.

For shorter workpieces A, it should be understood that a shorter arbor 1 having only a single sleeve 4 instead of the two sleeves shown could be provided, with wedge rings 14 disposed around one or both ends of the sleeve. Moreover, more than two sleeves could be provided, in which case both ends of the intermediate sleeves would have wedge rings 14 disposed therearound, and, if desired, such wedge rings 14 could be disposed around the outer ends of the other sleeves as well.

From the above discussion, it can now be seen that the hydraulic arbor disclosed herein is of a unique construction which permits quick assembly and disassembly of the deformable sleeves and body, while providing a unique leak-proof joint between the sleeve and body with the parts in the assembled condition. Moreover, such arbor is provided with novel means for advancing the plungers in fluid passages in the arbor body to build up the necessary fluid pressure for expanding the deformable sleeves.

Other modes of applying the principles of the invention may be employed, change being made as regards the details described, provided the features stated in any of the following claims or the equivalent of such be employed.

We therefore, particularly point out and distinctly claim as our invention:

1. In a hydraulic arbor, an arbor body and a metal workpiece-gripping sleeve telescoped over said body and defining therebetween a chamber of substantial axial length adapted to be filled with a hydraulic fluid, packing rings radially squeezed between said body and sleeve adjacent the ends of said chamber effective to seal the body-sleeve joints thereat, said sleeve between said packing rings being relatively thin so as to be radially expanded to grip a workpiece upon supplying fluid pressure to said chamber, said sleeve having an external tapered surface at one end axially adjacent the corresponding packing ring, and a wedge ring disposed around said external tapered surface and having a corresponding tapered internal surface in mating engagement therewith for wedging said one end into tight engagement with said body adjacent the corresponding packing ring to preclude radial deformation thereat.

2. The hydraulic arbor of claim 1 wherein said sleeve at its other end axially adjacent the other packing ring has an integral inturned lip portion secured to said body to preclude radial deformation of said sleeve thereat.

3. The hydraulic arbor of claim 2 wherein said sleeve at its other end is radially thickened further to resist radial deformation thereat.

4. The hydraulic arbor of claim 1 wherein said body has a passage leading to said chamber with a plunger disposed in said passage, and means are provided for moving said plunger in said passage to build up pressure in the fluid filling said passage and chamber tending to enlarge radially said chamber, including a nut threaded onto said body for axial movement into engagement with said plunger to force the same axially inwardly in said passage.

5. The hydraulic arbor of claim 4 wherein said nut has an annular groove with internal gear teeth formed in the wall thereof, and a pinion supported by a shaft engaging said internal gear teeth, whereby rotation of said pinion in opposite directions will cause tightening and loosening of said nut.

6. The hydraulic arbor of claim 1 wherein there are a pair of axially adjacent metal workpiece-gripping sleeves telescoped over said body, each of which defines with said body a chamber of substantial axial length and adapted to be filled with hydraulic fluid, packing rings radially squeezed between said body and said sleeves adjacent the ends of said chambers effective to seal the body-sleeve joints thereat, the inner ends off said sleeves axially adjacent the corresponding packing rings having external tapered surfaces, and a pair of wedge rings disposed back-to-back between said sleeves, said wedge rings having tapered internal surfaces in wedging engagement with the external tapered surfaces on said inner sleeve ends for maintaining said inner sleeve ends in tight engagement with said body.

7. The hydraulic arbor of claim 6 wherein there are a pair of passages in said body, each in fluid communication with both of said chambers, a plunger disposed in each of said passages, and a nut threaded onto said body for axial movement into engagement with said plungers to move said plungers in said passages to build up pressure in the fluid filling said passages and chambers tending to enlarge radially the latter.

8. The hydraulic arbor of claim 7 further comprising means for securing the outer ends of said sleeves to said body adjacent the corresponding packing rings to preclude radial deformation thereat.

9. The hydraulic arbor of claim 8 further including a stop means attached to said body adjacent the outer end of one of said sleeves for locating a workpiece on said arbor.

References Cited
UNITED STATES PATENTS

| | | |
|---|---|---|
| 1,433,818 | 10/1922 | Hill. |
| 2,630,039 | 3/1953 | Klemm. |
| 2,797,603 | 7/1957 | Atherholt. |
| 3,265,412 | 8/1966 | Reid _____ 285—342 X |

ROBERT C. RIORDON, *Primary Examiner.*

J. F. McKEOWN, *Assistant Examiner.*